(12) United States Patent
Moser

(10) Patent No.: US 8,547,689 B2
(45) Date of Patent: Oct. 1, 2013

(54) RECONFIGURABLE COMPUTER

(71) Applicant: George Moser, Redwood City, CA (US)

(72) Inventor: George Moser, Redwood City, CA (US)

(*) Notice: Subject to any disclaimer, the term of this patent is extended or adjusted under 35 U.S.C. 154(b) by 0 days.

(21) Appl. No.: 13/826,554

(22) Filed: Mar. 14, 2013

(65) Prior Publication Data

US 2013/0194740 A1  Aug. 1, 2013

Related U.S. Application Data

(63) Continuation of application No. 12/856,687, filed on Aug. 16, 2010, now Pat. No. 8,422,210, which is a continuation-in-part of application No. 12/634,672, filed on Dec. 9, 2009, now Pat. No. 8,264,829, which is a continuation-in-part of application No. 11/988,268, filed as application No. PCT/US2006/025399 on Jun. 29, 2006, now Pat. No. 7,656,652.

(60) Provisional application No. 60/734,652, filed on Nov. 9, 2005, provisional application No. 60/734,704, filed on Nov. 9, 2005.

(51) Int. Cl.
*G06F 1/16* (2006.01)

(52) U.S. Cl.
USPC ............... 361/679.01; 455/575.4; 345/690; 362/311.13; 248/924

(58) Field of Classification Search
USPC ........... 455/575.1, 575.3, 466, 414.1, 575.9, 455/575.4, 575.2; 345/1.3, 545, 564, 157, 345/659, 531, 690; 386/234; 361/679.01, 361/679.26, 679.55, 679.06, 679.09, 679.02, 361/679.29, 679.43; 362/311.02, 311.01, 362/311.13, 362; 248/163.1, 176.3, 346.01, 248/175, 918, 924
See application file for complete search history.

(56) References Cited

U.S. PATENT DOCUMENTS

| | | | |
|---|---|---|---|
| 5,646,818 A | 7/1997 | Hahn | |
| 5,729,429 A | 3/1998 | Brillhart et al. | |
| 6,384,811 B1 | 5/2002 | Kung et al. | |
| 6,496,365 B2 | 12/2002 | Tsai | |
| 6,735,377 B1 * | 5/2004 | Hsieh | 386/234 |
| 7,233,488 B2 | 6/2007 | Liou et al. | |
| 7,298,610 B2 | 11/2007 | Kim et al. | |
| 7,448,588 B2 | 11/2008 | Sung | |
| 7,599,181 B2 | 10/2009 | Chuang et al. | |
| 7,864,515 B2 | 1/2011 | Bunya et al. | |

(Continued)

FOREIGN PATENT DOCUMENTS

| | | |
|---|---|---|
| CN | 2859614 Y | 1/2007 |
| DE | 10337807 A1 | 3/2005 |
| KR | 10-0855503 B1 | 6/2003 |
| KR | 10-0571172 B1 | 4/2005 |

OTHER PUBLICATIONS

United States Office Action, U.S. Appl. No. 12/856,686, Jan. 15, 2013, 20 pages.

*Primary Examiner* — Hung Duong
(74) *Attorney, Agent, or Firm* — Brad Bertoglio

(57) ABSTRACT

A portable computer system is provided having a first unit with touch-sensitive LCD display screen and a detachable second unit having a keyboard. The first unit includes a support structure movable between a stowed position and a deployed position, which can support the first unit in an inclined position on a planar surface. The support structure can help support the first unit when mounted on the second unit, standing alone, or both.

16 Claims, 14 Drawing Sheets

(56) References Cited

U.S. PATENT DOCUMENTS

| | | |
|---|---|---|
| 8,081,446 B2 | 12/2011 | Hsu |
| 8,107,228 B2 | 1/2012 | Sassounian |
| 8,120,897 B2 | 2/2012 | Grove et al. |
| 8,243,427 B2 | 8/2012 | Fu |
| 2004/0058720 A1* | 3/2004 | Kubo et al. ............... 455/575.1 |
| 2008/0030426 A1* | 2/2008 | Hashimoto .................. 345/1.3 |
| 2011/0075340 A1 | 3/2011 | Qin |

* cited by examiner

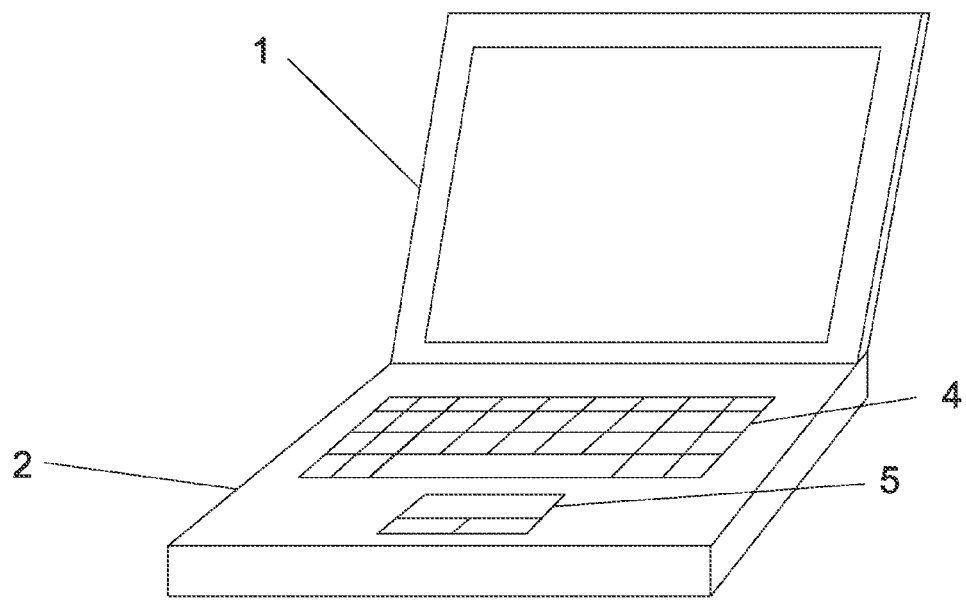
Figure 1  State of the Art
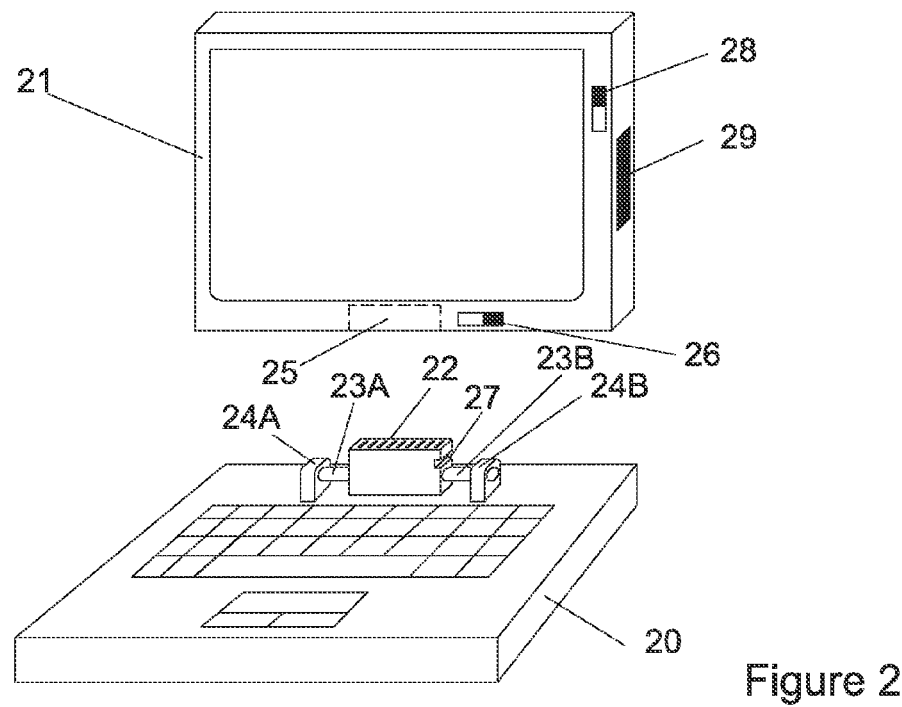
Figure 2

RECONFIGURABLE COMPUTER

This is a continuation application of pending U.S. patent application Ser. No. 12/856,687 filed Aug. 16, 2010; which is a continuation-in-part application of U.S. Pat. No. 8,264,829 issued on Sep. 11, 2012 (from U.S. patent application Ser. No. 12/634,672 filed Dec. 9, 2009); which is a continuation-in-part application of U.S. Pat. No. 7,656,652 issued on Feb. 2, 2010 (from U.S. patent application Ser. No. 11/988,268 filed on Jan. 4, 2008); which is a national stage of PCT International Application No. PCT/US2006/025399 filed on Jun. 29, 2006; which claims priority of U.S. Provisional Application No. 60/734,652 filed on Nov. 9, 2005, and U.S. Provisional Application No. 60/734,704 filed on Nov. 9, 2005. The content of each of the above-referenced patents and applications is hereby incorporated by reference into the present application.

BACKGROUND OF THE INVENTION

The present invention relates in general to the computer field, and in particular, to a portable computer that can easily be adjusted to different and varying user needs by changing its configuration.

Current portable computers are often designed using a clamshell configuration, which includes a base portion with a computer keyboard, connected at one edge to a display portion via a hinge mechanism. While the user is able to tilt the angle of the display, the display is otherwise fixed in relationship to the base unit.

The display portion of such clamshell portable computers typically has a fixed aspect ratio, in which the width of the display is greater than its height. Many conventional displays employ a 4:3 aspect ratio. Other displays provide various "widescreen" aspect ratios, such as 16:9. Such aspect ratios, having width greater than height, are sometimes referred to as "landscape" configurations.

While landscape display configurations may be efficient for some applications, there are other applications for which it may be desirable to employ a display configuration having a height greater than its width, i.e., a "portrait" display configuration. However, since many portable computers have a display with a fixed orientation, users may be forced to use a landscape display orientation, even for applications in which a portrait configuration would be more effective. For example, many of the standard papers sizes for printed documents have heights greater than their widths. For users creating or reviewing documents formatted for printing on such papers, a portrait display configuration may provide more efficient use of the display area. Therefore, in some circumstances, it may be desirable to provide a portable computer having a portrait display configuration, while other circumstances may call for a landscape display orientation. It may also be desirable to enable a user to select between landscape and portrait display configurations based upon the task presently at hand. Thus, in accordance with one aspect of some embodiments of the invention, a portable computer is provided having a display that can be readily changed between landscape and portrait configurations. Such a configurable display may enable a computer to improve a user's satisfaction and productivity in connection with a wide variety of applications.

Because portable computers typically have a fixed display, users are often forced to choose between a small computer which is highly portable but saddled with a small display having limited display area, and a larger computer having greater display area but a correspondingly larger size and reduced portability.

Several attempts have been made to provide a portable computer with the ability to rotate the display so that he user can switch between display and portrait viewing mode. Those attempts have found little acceptance, often suffering from some combination of complexity, weight, high cost and lack of reliability. However, significant productivity improvements may be achieved by matching the user's application with the correct viewing mode. The widespread use of such applications and computers worldwide provides significant opportunities for enhanced productivity. Therefore, in addition to changing the computer's configuration to allow for different viewing formats (portrait and landscape), some embodiments of this invention may allow the user to use different screen with different sizes on the same computer base. For embodiments featuring display units capable of operation independently of a base, multiple display units can be interchangeably utilized with a common, shared computer base unit.

SUMMARY OF THE INVENTION

In accordance with one aspect of the invention, a portable computer system includes a base unit and a detachable display unit. The display unit further includes a first connector on one side of the display unit, and a second connector on a second side of the display unit. Each of the first and second connectors can be removably engaged with a base connector, such that the display unit can be attached to the base in either of two orientations, e.g., portrait or landscape. In either case, the display unit can be affixed to the base unit in predetermined spatial relationships thereto.

The above computer architecture, aspects of which are addressed in U.S. Pat. No. 7,656,652 of which this is a related application, can be implemented in different ways, each an embodiment of the original invention. Each one of those embodiments is basically determined by the choice of where the computer components of the above architecture are housed. Those computer components include the motherboard, the data storage device (typically a hard disk drive), the energy storage device (battery) and several other devices (such as CD-ROM drive, USB connectors, network connectors, camera and others). For each one of these components a choice has to be made whether it will be housed (a) in the base unit; b) in the display unit; or (c) in both in order to provide some redundancy, some degree of fault-tolerance and some degree of standalone operation. For example, a choice has to be made whether the motherboard of the computer system will be located in the base unit, or in the display unit, or even in both the base unit and the display unit in order to achieve some degree of redundancy, fault-tolerance or standalone capability. Similarly, for the data storage device (such as a hard disk or a solid stage storage device) a choice must be made whether to house it in the base unit or in the display unit or in both. By the same token, for the energy storage device (such as a battery) a location has to be determined, which can be can in the base unit or in the display unit or in both. That same location decision has to be made for each component of the above computer architecture, which leads to different implementation embodiments of the original invention of U.S. Pat. No. 7,656,652.

In some embodiments, when detached from the base unit, the display unit may be adapted for standalone operation, and may include a touchscreen display panel, a microprocessor, digital memory and a battery. The base unit may include a second, supplemental battery that provides power to the display unit when attached thereto. The base unit may also include auxiliary digital storage, such as a second hard disk drive or solid state drive, which is accessible to the display unit when attached to the base unit. In order to help provide physical support for the display unit, the cross-sectional shape of the base unit connector may correspond to the cross-sectional shape of the display unit connectors.

In accordance with other aspects of the invention, a portable computer having a base unit and detachable display unit includes first and second display connectors within the display unit, capable of receiving electrical signals. The display unit further includes a display panel, and a digital switch for selectively conveying signals between the display panel and one of the first and second display connectors. The portable computer system may further include a mechanism for determining whether the display unit is oriented in a landscape or portrait orientation. The digital switch may be responsive to that mechanism for determining whether the display is oriented in a landscape or portrait orientation, and selectively interconnecting signals between one of the first and second display connectors, and the display panel or system board. The mechanism may include an accelerometer which outputs a signal indicative of an orientation in which the display unit is positioned. The switch may then be responsive to the accelerometer output. In other embodiments, conditions detected at the display connectors or base connector (e.g. a predetermined electrical signal, open condition, short condition or loopback condition) may be indicative of the display unit orientation.

In yet other embodiments, the mechanism may include a depressible pin extending from the base unit having an extended state and a depressed state. A void within the display unit may be positioned proximate the depressible pin when the display unit is engaged with one of the first or second display connectors, such that the pin remains in an extended state while the display unit is attached to the base unit. The digital switch may then receive a signal from the depressible pin indicative of the orientation of the display unit.

In accordance with another aspect of the invention, a portable computer system is provided having a base unit with one or more base connectors, a first display unit and a second display unit. The first and second display units can be removably attached to the base unit in multiple orientations (e.g. portrait or landscape). The base unit can be shared amongst multiple display units. The display unit may be capable of standalone operation, and may include a microprocessor, memory and touchscreen display.

In accordance with another aspect of the invention, a portable computer system with detachable displays can contain a support structure attached to the display that is selectively moved between stowed and deployed positions, for increased stability while deployed. In one embodiment, the support structure includes an elongated member rotatably secured to the display unit via a hinge structure. The support structure may include a distal portion that extends away from the display unit when moved into a deployed position. When deployed, the support structure can help support the display unit in an inclined position, particularly relative to a planar surface, while the display unit is attached to the base unit, detached from the base unit, or in either arrangement.

Additional structures may be included to provide support to the display unit. For example, the base unit may include one or more engagement tabs that engage corresponding receptacles in the display unit. In some embodiments, such support pins may be individually, rotatably connected to the base via, e.g., hinge structures that permit rotation of the tab about a predetermined axis through application of a threshold level of torque to the tab. In other embodiments, the support pins may be attached to a rotatable support bar. Alternatively, support pins may be attached to the display unit, with corresponding receptacles in the base unit. First and second receptacles may be provided in the display unit to engage with the engagement tab in portrait or landscape orientations. In some embodiments, such as those in which an engagement tab provides physical support for the display unit, a wireless communications protocol can be employed to create a communications link between the base unit and the display unit. A first transceiver can be mounted in the base unit, with a second transceiver mounted in the display unit. The first and second transceivers may be optical transceiver or radiofrequency transceivers.

In accordance with another aspect of the invention, a portable computer system is provided having a base unit, and a detachable display unit capable of attachment to the base unit via engagement with a base connector. The detachable display unit includes a microprocessor, battery and digital storage. The detachable display unit further includes a miniature keyboard selectively deployed from the display unit when detached from the base unit, to facilitate entry of information. In some embodiments, the keyboard may be slidably deployed between a first position substantially within the outer housing of the display unit, and a second position in which the keyboard extends outwards from the display unit outer housing. In other embodiments, the miniature keyboard is detachable from the display unit. The detachable miniature keyboard may include an electrical connector adapted to attach to either of two display unit connectors on adjacent sides of the display unit, such that the miniature keyboard can be readily used in either landscape or portrait orientations when the display unit is detached from the base unit.

These and other aspects of the invention will be apparent to a person of ordinary skill in view of the disclosure herein.

BRIEF DESCRIPTION OF THE DRAWINGS

FIG. 1 is a perspective view of a prior art portable computer

FIG. 2 is a perspective view of a portable computer having a detached display panel, in accordance with one embodiment of the present invention.

DETAILED DESCRIPTION OF THE DRAWINGS

Figure 3:
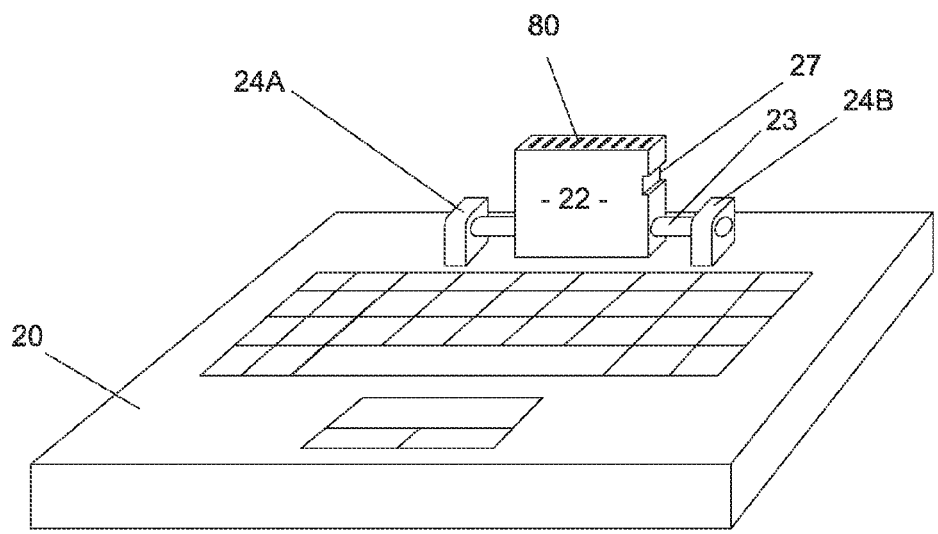
FIG. 3 is a perspective view of a portable computer base unit for use with detachable display unit.

While this invention is susceptible to embodiment in many different forms, there are shown in the drawings and will be described in detail herein several specific embodiments, with the understanding that the present disclosure is to be considered as an exemplification of the principles of the invention and is not intended to limit the invention to the embodiments illustrated.

FIG. 1 shows a conventional portable computer. The base 2 contains a keyboard 4 and a touch pad 5. The LCD display 1 is rotatably attached to the base. This is the state of the art approach, and it is being used in virtually all currently manufactured laptop PCs.

FIG. 2 illustrates a portable computer configured using a modular approach, in which the user can reconfigure the portable computer by detaching a display portion from a base portion. The same display unit can then be re-attached in a different position, such as at an orientation rotated 90 degrees from the prior position. Alternatively, a second display unit, having differing size, aspect ratio or other characteristics, can be attached to the base unit. The computer can thus be readily reconfigured for different tasks, applications or users.

The portable computer of FIG. 2 includes base portion 20 and display unit 21. Display unit 21 includes an LCD screen. Unlike the prior art LCD display provided by the computer of FIG. 1, display unit 21 can be removably attached to, and detached from, base portion 20. Specifically, base portion 20 includes tiltable connector 22. Connector 22 includes axles 23A and 23B, which engage friction hinges 24A and 24B, respectively. Friction hinges 24 are attached to base portion 20, and permit the rotation of connector 22 around the axis defined by axles 23, while maintaining a predetermined spatial relationship (i.e. separation) between base portion 20 and display unit 21. Connector 22 is adapted to engage with display unit connector receptacles 25 and 29.

FIG. 3 provides an expanded view of base unit 20 and connector 22. Connector 22 is rotatably supported by friction hinges 24A and 24B, allowing the user to adjust the viewing angle of an attached display. In this particular embodiment, connector 22 has a rectangular cross-section that mates with the rectangular cross-section of corresponding receptacles 25 and 29 in the display unit, to physically anchor the display unit into the base. Connector 22 includes retention slot 27, which can be used to engage a display unit latch to securely lock the display unit to the base unit in the chosen orientation and spatial relationship. Connector 22 is equipped with a set of electrical contacts 80 that mate with corresponding contacts in the display unit, towards providing power, data and video signals from computer base unit 20 to the display unit. While a variety of connector and electrical contact schemes can be employed, electrical contacts 80 are preferably spring-loaded contacts, which can be plugged and unplugged easily, withstand a high number of cycles and provide a quick and reliable means of interconnection.

As illustrated in FIG. 2, display unit 21 includes a first receptacle 25, into which connector 22 can be removably inserted to engage display unit 21 with base unit 20 in a landscape orientation. Because connector 22 is adapted for tilting, a user is able to adjust the angle of display unit 21 relative to base unit 20 while the computer is in use. The electrical contacts of connector 22 mate with electrical contacts in receptacle 25, to transfer electrical power, data and video signals from base unit 20 to display unit 21.

In addition to providing a means of electrical interconnection, the engagement of connector 22 into receptacle 25 also provides mechanical support for display unit 21. In order to further secure display unit 21 to base portion 20 while in use, sliding latch 26 can be moved towards receptacle 25 while mated with connector 22, whereby latch mechanism 26 mechanically engages retention slot 27, thereby securely locking display unit 21 onto tilting connector 22.

Figure 4:
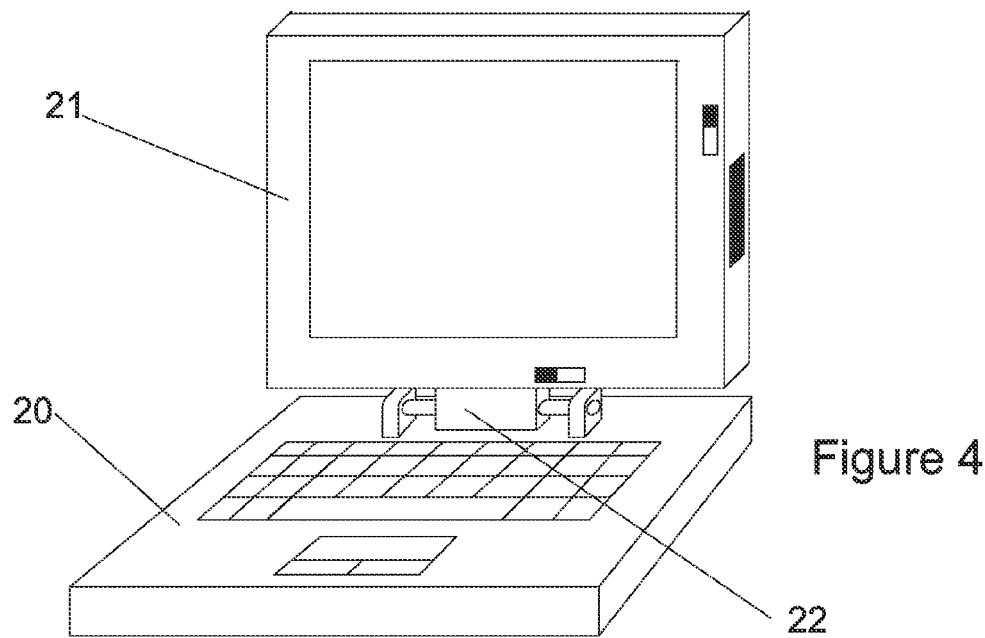
FIG. 4 is a perspective view of a portable computer, in which a detachable display panel is engaged in a landscape orientation.
Figure 5:
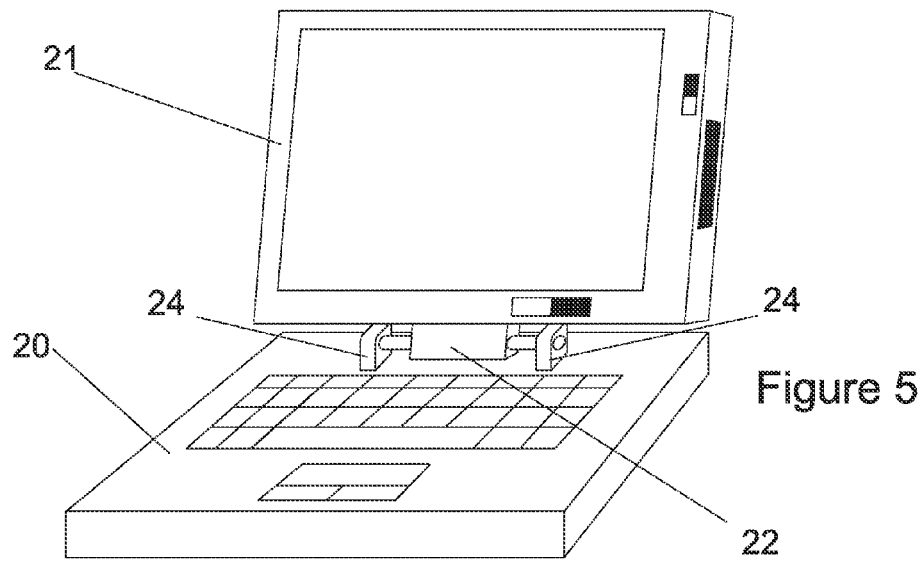
FIG. 5 is a perspective view of the portable computer of FIG. 4, in which the display panel is tilted relative to the base.

FIG. 4 illustrates the portable computer system of FIG. 2, where display unit 21 has been connected to base unit 20 by engaging connector 22 into receptacle 25, thereby providing a landscape display orientation. FIG. 5 shows a further configuration in which display unit 21 has been tilted relative to base unit 20 to adjust the display viewing angle, by using hinges 24 to rotate connector 22.

Figure 6:
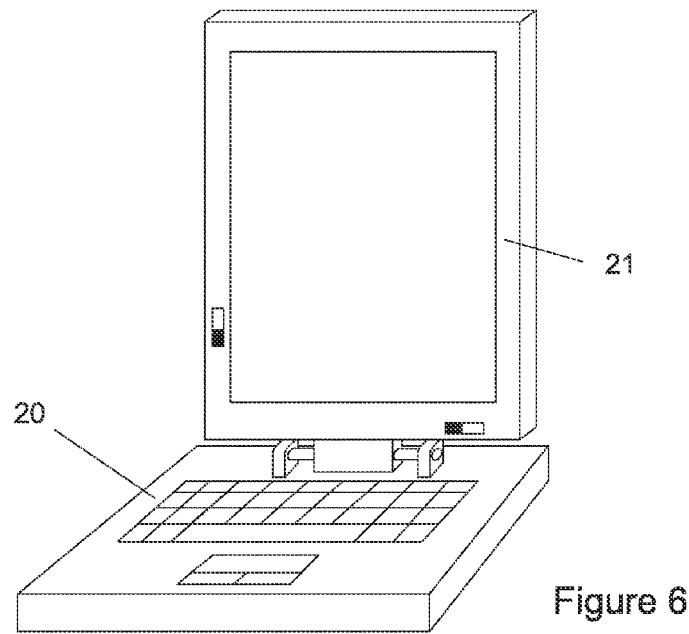
FIG. 6 is a perspective view of a portable computer, in which a detachable display panel is engaged in a portrait orientation.

Display unit 21 further includes a second receptacle 29 (FIG. 2), positioned on a side of display unit 21 that is adjacent to the side on which receptacle 25 is positioned. Display unit 21 can alternatively be engaged with connector 22 by inserting connector 22 into second receptacle 29, to provide a portrait display orientation. Latch mechanism 28 operates analogously to latch mechanism 26, to provide a further means of mechanically engaging display unit 21 with connector 22, when operated with a portrait display orientation. FIG. 6 shows display unit 21 connected to base unit 20 via the second receptacle, to provide a portrait display orientation. As with the landscape orientation, display unit 21 can be tilted to adjust the viewing angle of the display.

Second receptacle 29 includes an alternative set of electrical contacts capable of removable interconnection with the contacts of connector 22, through which power and signaling can be conveyed from base portion 20 to display unit 21. Amongst the information conveyed between display unit 21 and base portion 20 may be an indication of the orientation of the display unit, such as an indication of which of receptacles 25 or 29 is engaged with connector 22. This information can then be used by computer base portion 20 to automatically reformat the display information sent to display unit 21, for optimal presentation with the current display aspect ratio. For example, if the computer of FIG. 2 is used for a word processing application with connector 22 engaged into receptacle 25 (i.e. a landscape display orientation), a user may wish to reconfigure the computer to have a portrait display orientation. After disconnecting display unit 21 from base unit 20, display unit 21 can be reattached to base unit 20 in a portrait orientation by engaging connector 22 with receptacle 29. By detecting the changed display orientation, base unit 20 can automatically reformat its display data such that it presents image information sized for a portrait aspect ratio. Thus, the user can continue working on the computer seamlessly.

The ability to select a desired landscape and portrait display orientation may provide significant efficiency and/or user satisfaction benefits for some applications. Furthermore, by enabling a user to readily switch between landscape and portrait displays, the computer can be used to optimally display information for a wide variety of different applications.

By enabling a user to readily switch between landscape and portrait screen orientations, the user may be able to achieve greater and more efficient utilization of the screen area provided by any given display. Accordingly, the user may be able to operate using a smaller display screen than would otherwise be required. By enabling the use of a smaller display screen, the present design can provide increased portability and reduced cost.

By implementing a modular portable computer configuration, having separable base and display units, a single base unit can optionally be used with a plurality of different display units. For example, it may be desirable to provide a small, thin, lightweight display unit for increased portability while traveling. Meanwhile, a larger display panel can be attached to provide increased display area at fixed locations such as a user's home or office. For users who regularly travel between two locations such as their home and office, separate display panels can be stored at each location, such that the user need only transport the base unit. Likewise, separate base units can be stored at each location, such that the user need only transport the display unit.

Figure 6B:
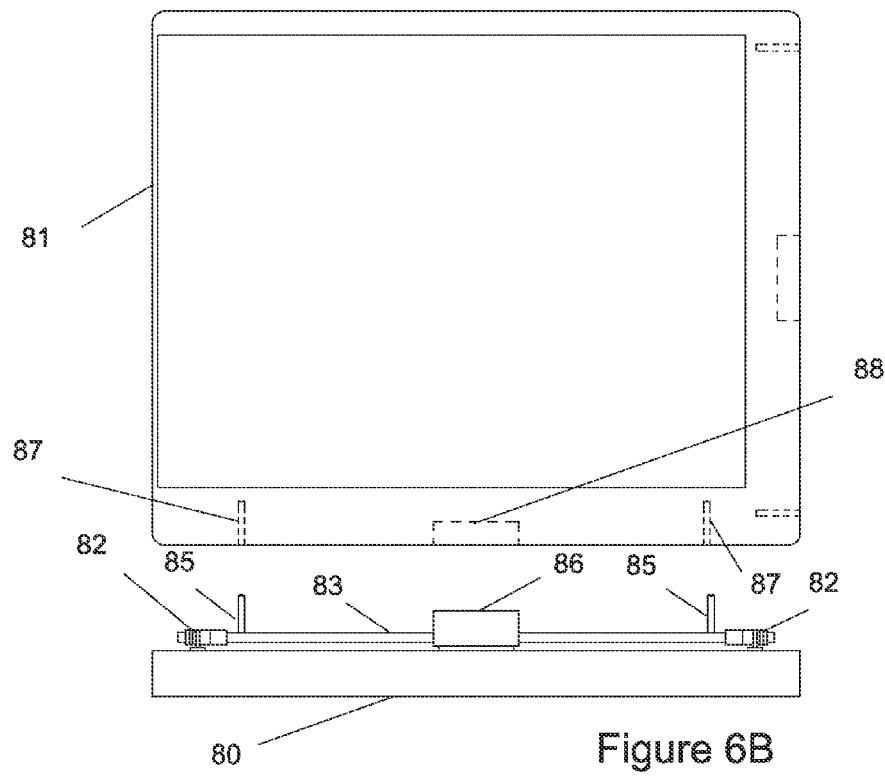
FIG. 6B is a perspective view of a portable computer, in which base unit engagement tabs provide physical support for a display unit.

FIG. 6B illustrates another embodiment in which engagement tabs provide physical support between the base unit and display unit. Base unit 80 includes support shaft 83, which rotates on hinge mechanism 82. Attached to support shaft 83 is base connector 86 and support pins 85. Display unit 81 includes receptacles 87 and 88. While receptacle 88 provides for engagement of electrical connector 86, receptacles 87 provide for engagement of support pins 85 to provide physical support to display unit 81 when display unit 81 is attached in a landscape orientation. Similar receptacles are provided along an adjacent side of display unit 81, to provide for engagement of support pins 85 when display unit 81 is attached in a portrait orientation. In other embodiments, use of one or more engagement tabs, such as support pins 85, may enable conveyance of electrical signals between the base unit and display unit via a wireless digital communications link. First and second transceivers may be provided to facilitate the wireless communications link. The transceivers may be optical or radiofrequency.

Figure 7:
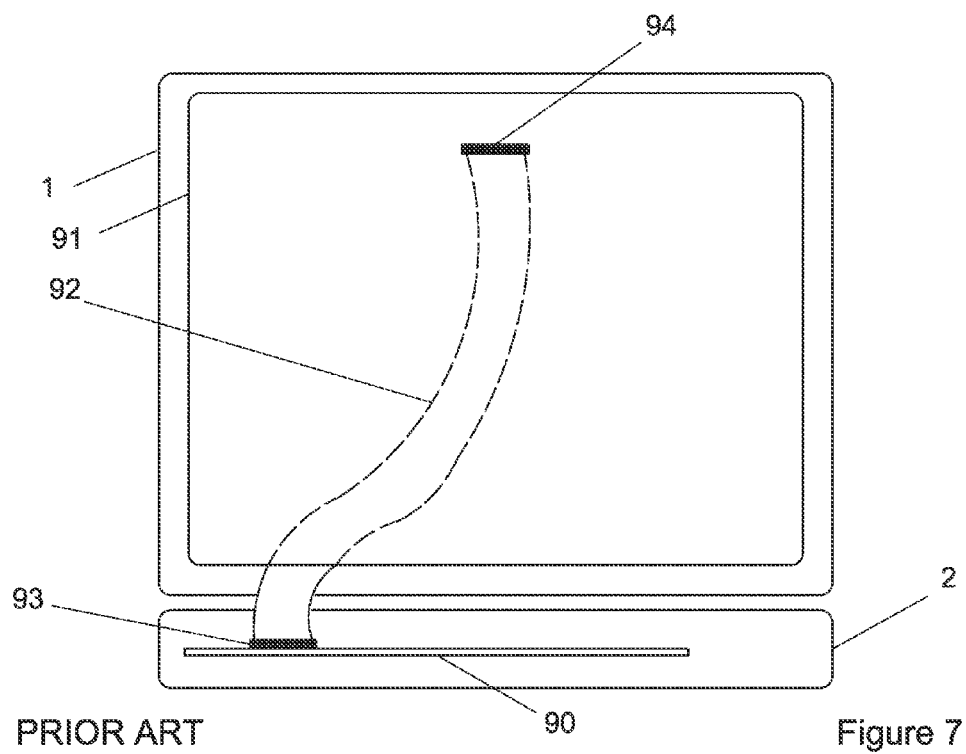
FIG. 7 is a schematic block diagram of the wiring interconnection between the base and display portions of a prior art portable computer.

FIG. 7 shows the electrical interconnection with a LCD display panel of a typical prior art portable computer having a fixed display orientation, such as that depicted in FIG. 1. Base portion 1 contains a motherboard 90 (also often called system board in the laptop industry) that sends video signals to LCD panel 91 contained in the display unit 1. This is accomplished via wiring harness 92, which plugs into a video connector 93 on motherboard 90 on one end, and into the LCD panel video connector 94 on the other end. Connector 94 is typically located in the back of LCD panel 91. The wiring harness crosses over from base portion 2 to display unit 1 through adjoining slots, holes or apertures in the base and the display units. The wiring harness typically has some extra length that provides slack to allow the user to vary the viewing angle of the display unit without stressing the wiring harness or the connectors.

Figure 8:
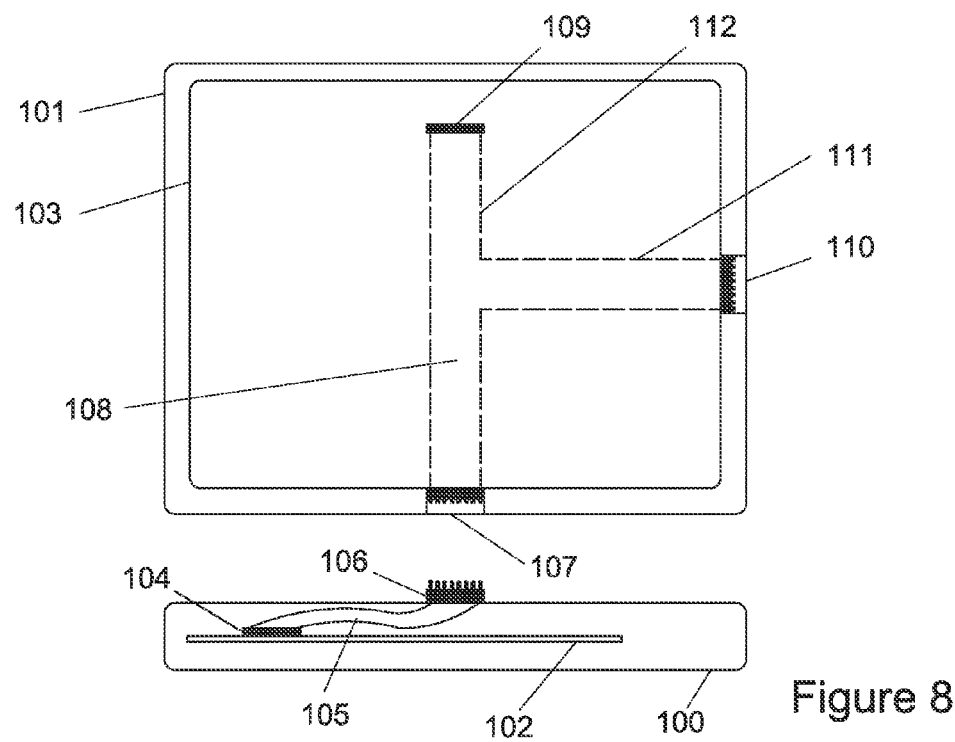
FIG. 8 is a schematic block diagram of the wiring interconnection between the base unit and display unit of a portable computer system, in accordance with another embodiment of the invention.

While there are many different ways to provide electrical interconnection between the base unit and a removable display unit of a portable computer such as that of FIG. 2, FIG. 8 shows the internal wiring of one such embodiment. Computer base unit 100 contains motherboard 102, which sends power, video and/or data signals to LCD panel 103 contained in display unit 101. This is accomplished by first sending the signal from motherboard connector 104 to base connector 106 via wiring harness 105. Connector 106 is a tiltable connector, to allow the user to adjust its angle with respect to the base. Wiring harness 105 is provided with some extra length to provide slack, thereby preventing stress on the harness and the connectors when the angle of the tiltable connector 106 is changed.

While connector 106 can be implemented using conventional frictional interconnection points, connector 106 preferably includes spring-loaded pins, which provide a reliable electrical connection while enabling rapid and easy insertion into, and removal from, an associated receptacle. Such a spring-loaded connector configuration may provide reduced frictional insertion and withdrawal forces as compared to other types of conventional connectors, thereby enabling connector 106 to withstand a high number of connection cycles and potentially reducing the difficulty of use for the user and the likelihood that the connector will fail.

Display unit receptacle socket 107 mates with connector 106 to receive power, video and/or data signals from the base when display unit 101 is attached in a landscape orientation, and convey those signals to LCD connector 109. Display unit 101 further includes receptacle socket 110, which can mate with connector 106 to receive power, video and/or data signals from the base when display unit 101 is attached in a portrait orientation. Receptacle socket 110 is also capable of conveying electrical signals to LCD connector 109.

Wiring harness 112 is used to lead power, video and/or data signals coming from receptacle sockets 107 and 110, to LCD connector 109. Wiring harness 112 has a vertical branch 108 connected to socket receptacle 107 and a horizontal branch 111 connected to socket receptacle 110. The vertical branch 108 is used when the display unit is plugged in landscape mode, and the horizontal branch 111 is used when the display unit is plugged in portrait mode.

In the illustrated embodiment, in which connector 106 includes spring-loaded pins, receptacle sockets 107 and 110 include sets of passive contacts that serve as landing contacts for the spring-loaded pins from connector 106. Alternatively, the spring-loaded pins could be provided in receptacle sockets 107 and 110, with passive landing contacts on connector 106. However, to the extent that spring-loaded connectors are often more expensive than passive contacts, it may be preferable to put the spring-loaded connectors on the base side, because on the base unit there is only one connector, while the display has two receptacles.

The configuration shown in FIG. 8 allows the user to easily plug the display unit into the base unit using either landscape or portrait modes as desired. However, in some embodiments and applications, the incorporation of two, alternative electrical signaling paths between the base unit and a display panel may introduce potential issues with electromagnetic interference ("EMI"). For instance, in the embodiment of FIG. 8, when the display unit is attached in the landscape orientation, the vertical branch 108 is the active branch, while branch 111 remains unused. However, in that case, branch 111 may act as an antenna and pick up noise and interference that can distort the signals conveyed to display connector 109—and potentially degrade the quality of the display image. Therefore, it may be desirable to implement electromagnetic shielding of wiring harness 112. Other known, active and passive EMI suppression techniques can be implemented to improve the integrity of signals conveyed on wiring harness 112.

Figure 9:
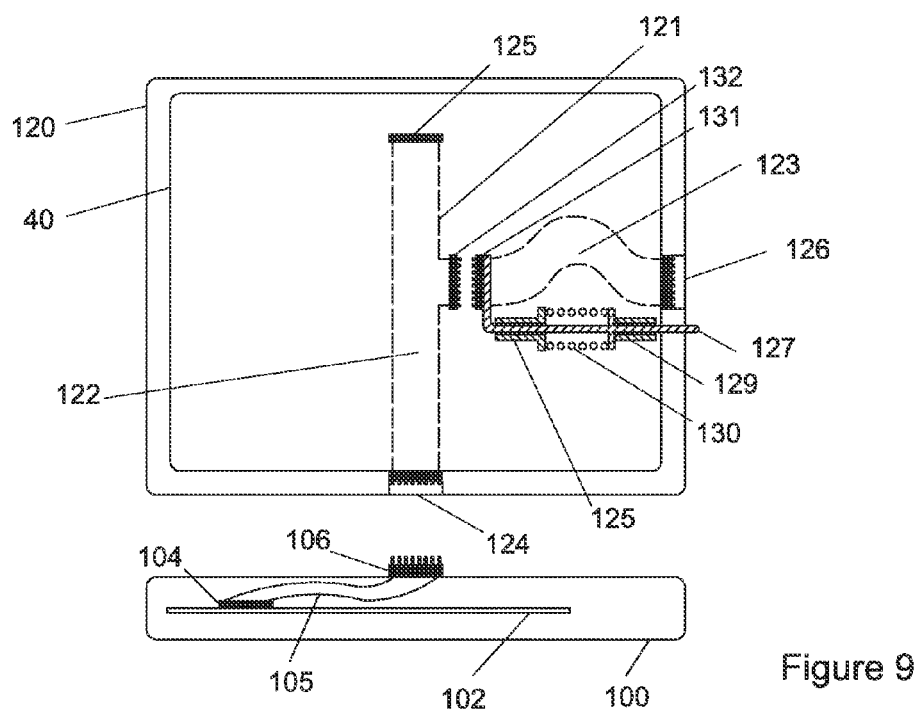
FIG. 9 is a schematic block diagram of the wiring interconnection between the base unit and display unit portions of a portable computer, in accordance with another embodiment of the invention.

Another technique for controlling EMI on the display wiring harness is illustrated in FIG. 9. In the embodiment of FIG. 9, display unit 120 includes wiring harness 121, having vertical branch 122 and horizontal branch 123. Vertical branch 122 provides electrical interconnection between socket receptacle 124 and LCD panel connector 125. Horizontal branch 123 can provide electrical interconnection between socket receptacle 126 and LCD panel connector 125. However, horizontal branch 123 is separable from the main portion of wiring harness 121, such that an electrical connection is established only when display unit 120 is attached to base unit 100 in a portrait orientation. Accordingly, when horizontal branch 123 is in use, an electrical connection is provided. When horizontal branch 123 is not in use, the connection is opened to avoid undesired conductance of EMI onto wiring harness 121.

In the embodiment of FIG. 9, the connection and disconnection of horizontal branch 123 is achieved through the operation of finger 127. When display unit 120 is attached to base unit 100 in a portrait orientation via engagement of base connector 106 with receptacle 126, finger 127 is depressed by contact with the top surface of base unit 100. Finger 127 is a pin guided by guides 128 and 129, and is biased outwardly from the display unit by the operation of coil spring 130. One end of coil spring 130 bears against fixed pin guide 128, while the other end of spring 130 bears against a flange on finger 127, pressing the tip of finger 127 outwards from the surface of display unit 120. The opposite end of finger 127 supports connector 131, which mates with connector 132 when the display unit is attached to base unit 100 in a portrait mode. When display unit 120 is not plugged into base unit 100 in a portrait orientation, the force of spring 130 separates connector 131 from connector 132, thereby breaking the electrical connection of horizontal branch 123 from wiring harness 121. This structure keeps branch 123 disconnected from the wiring harness 121 when not in use, preventing it from acting as an antenna and creating interference problems. A similar structure can also be used to connect and disconnect the vertical branch 122. However, in many cases that is not necessary, because the electromagnetic fields involved are often directional, such that only one of the branches creates the described antenna effect. In general it has been found empirically during the development, prototyping and testing of this invention that it may be sufficient to disconnect one of the branches to sufficiently mitigate problems caused by EMI.

Figure 10:
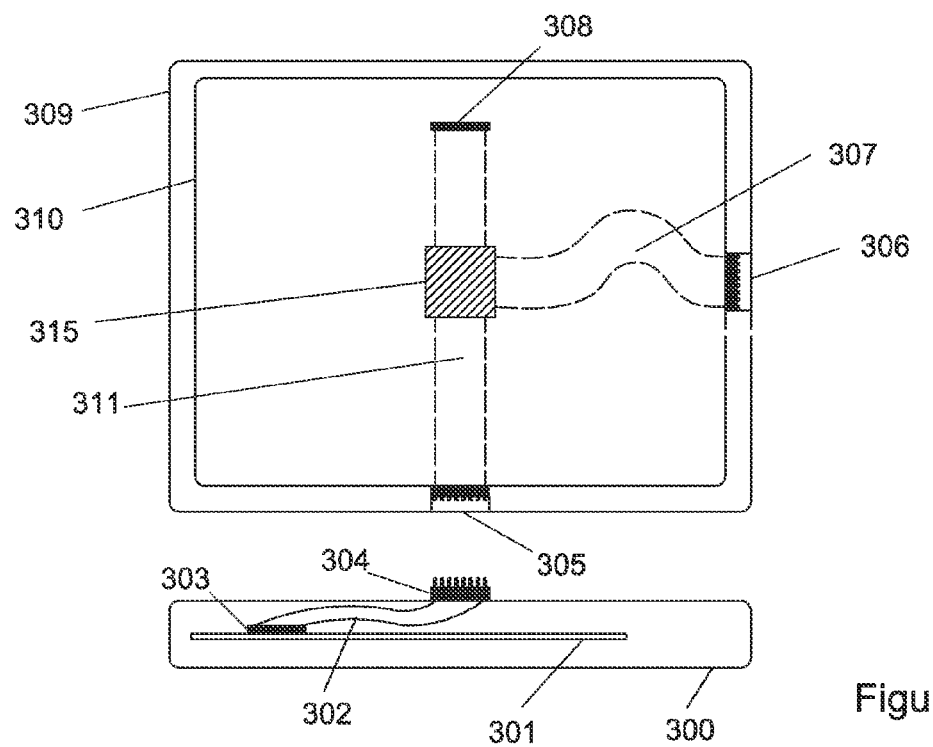
FIG. 10 is a schematic block diagram of the wiring interconnection between the base unit and display unit portions of a portable computer, in accordance with another embodiment of the invention.

While the embodiment of FIG. 9 provides a mechanical means of connecting and disconnecting a branch of the wiring harness, it is understood that electrical disconnection means could also be implemented. For example, FIG. 10 illustrates another exemplary embodiment of an anti-interference feature. Computer base 300 contains motherboard 301 and motherboard video output connector 303. Motherboard video connector 303 is connected to base video connector 304 via video cable 302. The embodiment of FIG. 10 further includes detachable display unit 309. Display unit 309 includes LCD panel 310, and display video connectors 305 (used for landscape mode attachments) and 306 (for portrait mode attachment). Within display unit 309, display connectors 305 and 306 are attached to inputs on a digital switch, namely, switching board 315 via cables 311 and 307, respectively. An output of switching board 315 is connected to display panel connector 308.

In landscape mode, switching board 315 routes signals from its incoming cable 311 to video connector 308, while blocking signals from cable 307 (unused during landscape mode operation). This helps avoid cable 307 acting as a source of electromagnetic interference through, e.g., an antenna effect. By electrically disconnecting cable 307, undesired effects from potential energizing of conductors within connector 306, which may be externally exposed in some embodiments, are also avoided.

In portrait mode, switching board 315 routes signals from its incoming cable 307 to video connector 308, while blocking signals from cable 311 (unused during portrait mode operation). This helps avoid cable 311 acting as a source of electromagnetic interference, as well as any potential undesired effects from energizing of conductors within connector 305.

As previously indicated, by detecting the landscape or portrait orientation of the display unit, users can automatically switch between orientations, with display content being reformatted to match the selected orientation. If the motherboard resides in the base unit, then a means for detecting display unit orientation by the base unit can be provided. In some embodiments, an electrical means of detecting display orientation may be provided. In the embodiment of FIG. 10, pins within connectors 305 and 306 can be configured differently to enable distinguishing of display orientation. For example, a connector pin within connector 305 may be configured in a loopback configuration with direct connection to another pin within connector 305. The analogous pin within connector 306 may be left open. Therefore, if motherboard 301 detects a loopback condition at connector 304, display unit 309 can be determined to be in a landscape orientation. If a loopback condition is not detected at connector 304, the display unit can be determined to be disconnected or in a portrait orientation.

Figure 11:
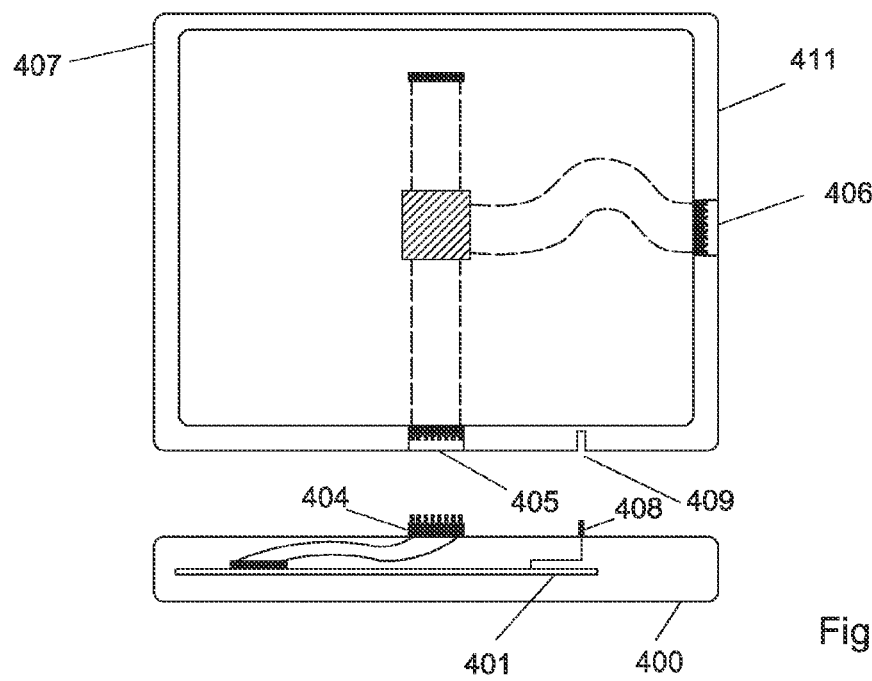
FIG. 11 is a schematic block diagram of the wiring interconnection between the base unit and display unit portions of a portable computer, in accordance with another embodiment of the invention.

Alternatively, FIG. 11 illustrates an exemplary mechanical means of detecting display orientation. Base unit 400 contains motherboard 401, and depressible pin switch 408. Pin switch 408 is connected to motherboard 401, such that motherboard 401 can detect the state of pin switch 408. Display unit 407 includes recess 409. Recess 409 is positioned on display unit 407 such that it is aligned with pin switch 408 when display unit 407 is attached to base unit 400 in a landscape orientation (i.e. when connector 404 engages receptacle 405), thereby allowing pin switch 408 to remain in its extended position. When display unit 407 is attached to base unit 400 in a portrait orientation (i.e. connector 404 engages receptacle 406), pin switch 407 contacts flat surface 411 of display unit 407, thereby depressing pin switch 407. Thus, by monitoring the state of pin switch 408, motherboard 401 can detect whether display unit 407 is attached in a portrait orientation, and adapt its display output accordingly.

Figure 12:
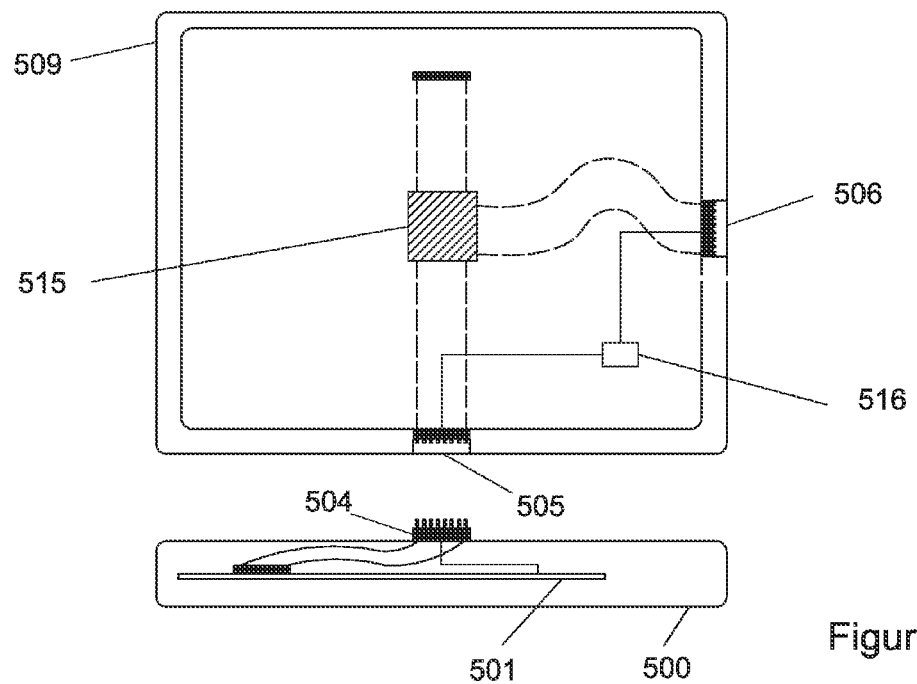
FIG. 12 is a schematic block diagram of the wiring interconnection between the base unit and display unit portions of a portable computer, in accordance with another embodiment of the invention.

FIG. 12 illustrates another embodiment providing for detection of landscape or portrait display orientation. In the embodiment of FIG. 12, motherboard 501 resides within base unit 500. Display unit 509 includes position sensor 516. Position sensor 516 provides outputs to display connectors 505 and 506 indicative of the orientation of display unit 509. For example, position sensor 516 may include an accelerometer, a gravity-activated switch, or other circuits for detecting differing orientations. Motherboard 501 can then receive the output of position sensor 516 via base connector 504, and adjust the orientation of video output in accordance with the display orientation. While position sensor 516 is depicted schematically as a separate device within the embodiment of FIG. 12, it is understood that in other embodiments, the position sensor could be incorporated into other circuit boards, such as switching board 515. Similarly, portable computing devices may include position sensors utilized for other purposes, which could be further utilized as position sensor 516.

Figure 13:
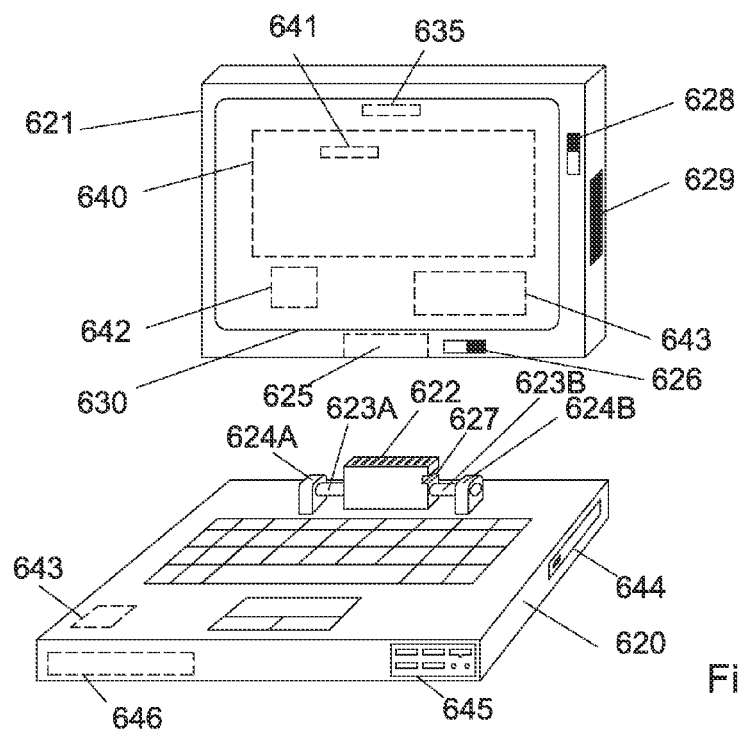
FIG. 13 is a perspective view schematic block diagram of a portable computer with removable display unit, in accordance with another embodiment of the invention.

While the motherboard may reside within the base unit for some embodiments of the invention, it is understood that the invention need not be limited to such embodiments. Concepts illustrated herein may be equally valuable in embodiments where the motherboard and associated components are located within the detachable display unit. One such embodiment is illustrated in FIG. 13. The portable computer of FIG. 13 includes base portion 620 and detachable display unit 621. Display unit 621 includes an LCD screen 630, which has video connector 635 to receive video input signals and generate images on LCD 630. LCD screen 630 can be touch-sensitive, i.e. a touchscreen. Display unit 621 can be removably attached to, and detached from, base portion 620. Specifically, base portion 620 includes tiltable connector 622. Connector 622 includes axles 623A and 623B, which engage friction hinges 624A and 624B, respectively. Friction hinges 624 are attached to base portion 620, and permit the rotation of connector 622 around the axis defined by axles 623. Base connector 622 can be removably engaged with display receptacles 625 and 629, and secured by engagement of sliding latch 626 or 628 with base connector 627.

Display unit 621 includes motherboard 640. By incorporating motherboard 640 within display unit 621, the distance between motherboard video connector 641 and LCD video connector 635 is reduced, thereby potentially reducing EMI interference and possible image quality degradation. Also, the arrangement of FIG. 13 eliminates the need to convey video signals across a detachable connector system, further reducing the signal path length and avoiding potential image signal degradation. The arrangement of FIG. 13 can also eliminate the need for decoupling or switching systems to connect a single one of multiple display unit connectors based on landscape or portrait orientation.

As further illustrated in FIG. 13, the detachable display unit may also contain other components that might otherwise be included in a base unit. For example, storage device 642, situated within display unit 621, may comprise a hard disk drive or solid state storage device. Battery 643 provides display unit 621 with the capability of operating independently of base unit 620 for a period of time, whereby display unit 621 can retain and display information, and optionally accept input through a touchscreen or other input means. Other components that may readily be incorporated into display unit 621 include an accelerometer or other position sensing device, battery charging circuitry, a modem, a WiFi wireless networking adapter, an Ethernet wired networking adapter, speakers, a microphone, an integrated cellular communications adapter, and other features commonly found within conventional portable computers. Accordingly, display unit 621 can be used independently as a highly portable standalone device (such as for checking emails while traveling), or connected to a base unit. While connected to a base unit, a full-sized physical keyboard is provided by the base unit.

Optionally, base unit 620 can provide other enhanced capabilities beyond a full-sized physical keyboard. For example, base unit 620 includes an auxiliary digital storage device in the form of high-capacity hard drive 643 to provide supplemental data storage accessible when display unit 621 is connected to base unit 620. Base unit 620 also provides optical storage device 644, which may be a CDROM or DVD drive. Base unit 620 includes port expander 645, to provide additional capacity for connection of external peripherals. Finally, base unit 620 includes high-capacity battery 646, which may be desirable to provide extended portable operating capacity. Thus, base unit 620 can be used to provide enhanced operating capabilities for portable display unit computers such as display 621. One benefit of the arrangement of FIG. 13 is that a single base unit can be provided and used interchangeably with multiple different display units.

Figure 14:
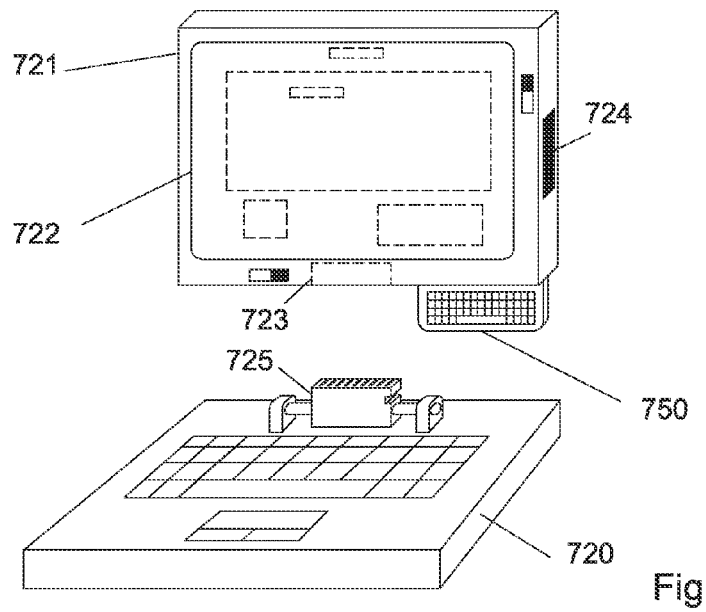
FIG. 14 is a perspective view schematic block diagram of a portable computer having removable display unit with deployable keyboard, in accordance with another embodiment of the invention.

In embodiments where the display unit is capable of standalone operation, it may be desirable to incorporate a compact, miniature physical keyboard into the display unit to facilitate input of information when the display unit is disconnected from the base unit. FIG. 14 illustrates one such embodiment. Display unit 721 includes touch-sensitive LCD panel 722, and is adapted for removable attachment to base unit 720. Display unit 721 is further equipped with small keyboard 750. Keyboard 750 may be incorporated to slidably extend from and retract within the outer housing of display unit 721. Alternatively, keyboard 750 may be removably attached to display unit 721. In embodiments where keyboard 750 is removably attached to display unit 721, keyboard 750 can optionally connect to display unit 721 through engagement of a keyboard connector with either of display connectors 723 or 724. To the extent that keyboard 750 does not occupy display connector receptacles 723 or 724, keyboard 750 can be positioned to avoid interfering with attachment of display unit 721 to base unit 720. Furthermore, to the extent that keyboard 750 is slidably mounted to withdraw within and extend from the housing of display unit 721, in some embodiments, keyboard 750 can be positioned to contact a flat surface of base unit 720 during engagement of base connector 725 with display receptacle connector 723, thereby automatically withdrawing keyboard 750 within the outer housing of display unit 721.

Figure 15:
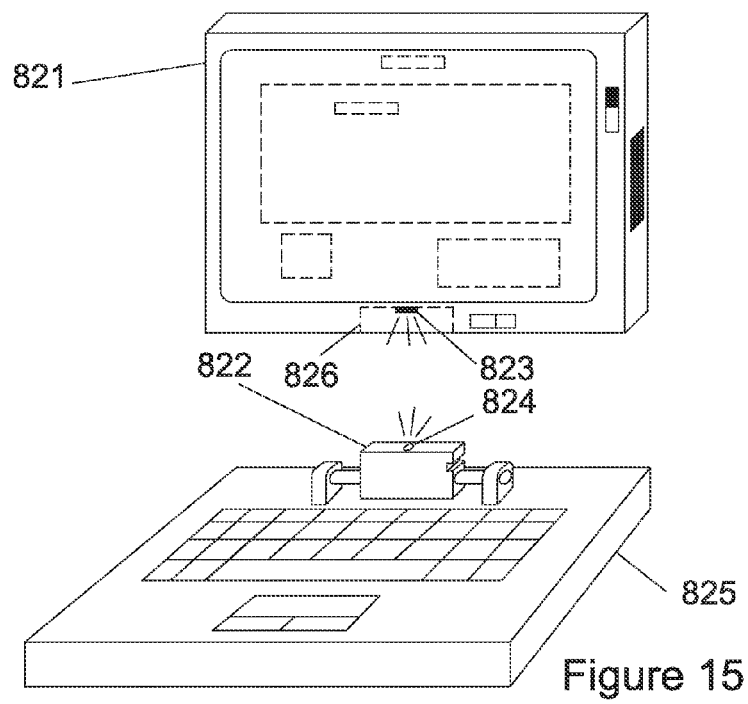
FIG. 15 is a perspective view schematic block diagram of a portable computer having removable display unit with wireless communications link between the display and base.

While various illustrated embodiments of base units and detachable display units include connectors to convey electrical signals between the two units, it is understood that wireless communications links could additionally or alternatively be employed to convey signals between the units. Such wireless communications links may be desirable in some applications. For example, wireless communications links may reduce possible wear or breakage that physical connectors can experience after repeated insertion and removal. FIG. 15 illustrates such an embodiment. In the embodiment of FIG. 15, base unit 825 includes hinged tab 822. Display unit 821 features tab receptacle 826. Tab receptacle 826 is adapted to receive hinged tab 822 to permit removable attachment of display unit 821 to base unit 825.

Hinged tab 822 includes wireless signal transceiver 824. Likewise, receptacle 826 includes wireless signal transceiver 823. Wireless signal transceivers 823 and 824 are adapted for wireless conveyance of digital information between them. Transceivers 823 and 824 can apply any of a variety of digital wireless communication protocols, including, without limitation, light-based techniques (e.g. infrared, photocell, laser) or radio signaling.

Figure 16:
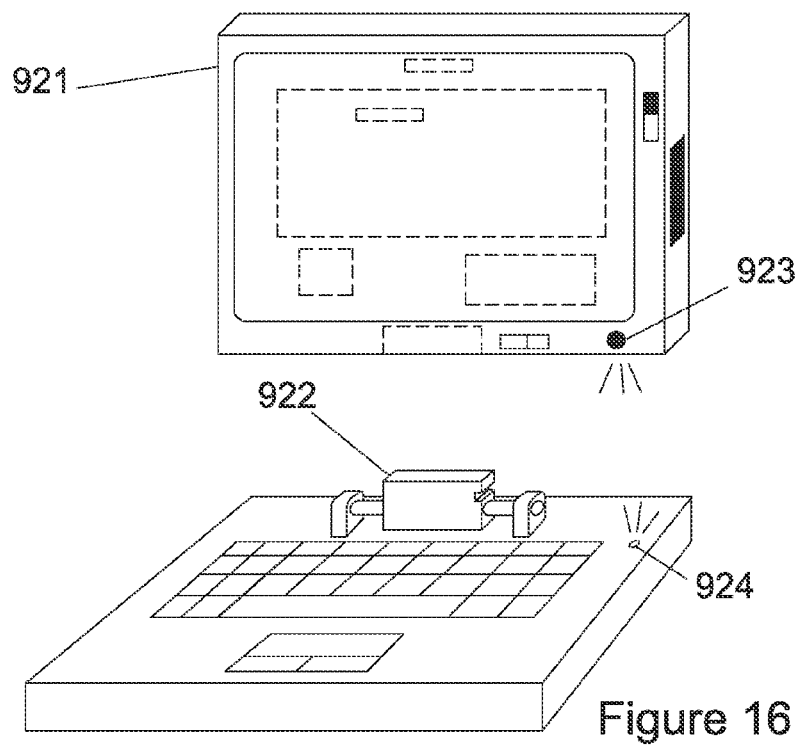
FIG. 16 is a perspective view schematic block diagram of another embodiment of a portable computer having removable display unit with wireless communications link between the display and base.

While in some embodiments it may be desirable to incorporate wireless signals transceivers 823 and 824 into receptacle 826 and tab 822, it is understood that alternative locations can also be accommodated. For example, the embodiment of FIG. 16 includes base unit wireless signal transceiver 924 and display unit wireless signal transceiver 923, mounted in locations that are independent of the hinge and attachment system 922 between base unit 925 and display unit 921. While it may be desirable for optical transceivers to be located in positions having unobstructed line of site between them, radiofrequency transceivers may be arbitrarily positionable within their respective signal ranges.

Figure 17:
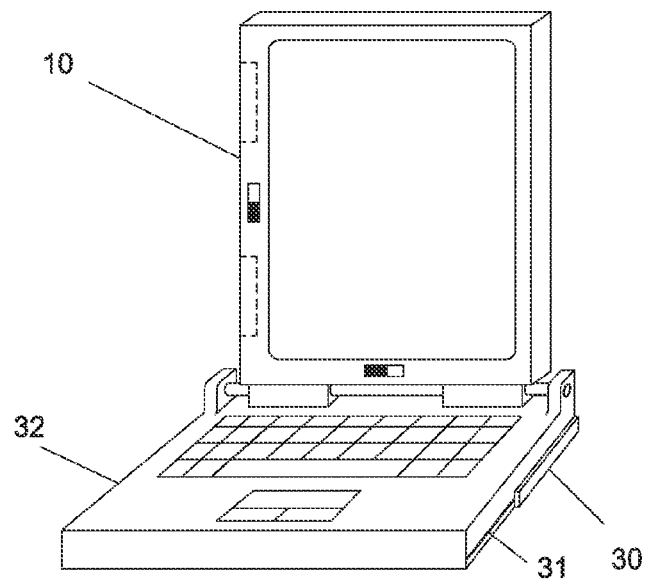
FIG. 17 is a perspective view of a portable computer, having a support structure in a stowed position, in accordance with another embodiment of the invention.

In addition to signaling between units, use of interchangeable base and display units may require consideration of physical factors. One possible issue when switching from landscape to portrait orientation, or when utilizing a comparatively large detachable display with a smaller base unit, is that the increased height of the screen can shift the center of gravity of the computer, potentially making the computer unstable. FIG. 17 illustrates another embodiment of the invention, which addresses that issue.

In the embodiment of FIG. 17, screen 10 can be removably attached to computer base 32. Base 32 includes slidable support beams 30, attached to both lower rear sides of base 32. Support beams 30 are slidably engaged with grooves 31, such that they can be moved into a stowed position or deployed position. In a stowed position, support beams 30 are maintained substantially within the perimeter of base 32. In a deployed position, support beams 30 extend outwards from the rear edge of base 32. Support beams 30 can be moved into a deployed position to provide added stability to base 32 when the bottom of base 32 is resting on a surface.

Figure 18:
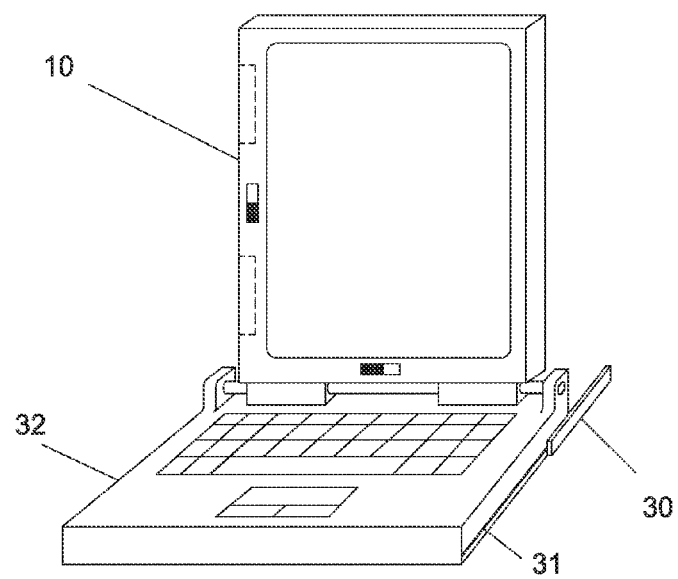
FIG. 18 is a perspective view of the portable computer of FIG. 17, in which the support structure is in a deployed position.

FIG. 18 illustrates the embodiment of FIG. 17, in which display 10 is engaged with base 32 in a portrait orientation, and support beams 30 are deployed, stabilizing the computer and reducing its likelihood of tipping backwards.

Figure 19:
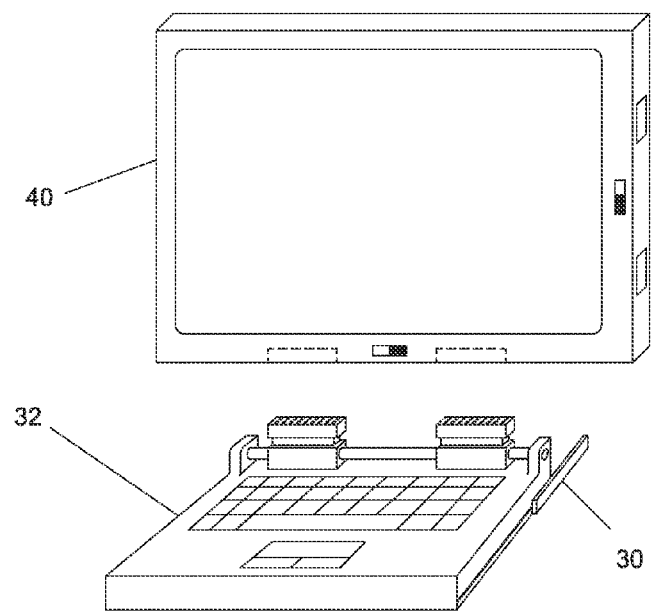
FIG. 19 is a perspective view of a portable computer having an oversized detachable display with deployed support structures.

FIG. 19 illustrates another embodiment of the invention, in which a large screen can be engaged with a comparatively small base while still maintaining stability of the computer. Large screen 40 is oriented for engagement with base 32, with support beams 30 oriented in a deployed configuration. This capability enables a user to travel with a small screen and small base, while using a larger screen with the same base when working in the office or home. For instance, base 32 may comprise a small netbook computer, which is comfortably used with a small screen while traveling to check emails and perform simple word processing. Later back in the office, a user of base 32 can switch to large screen 40 for enhanced productivity using applications that require greater display size.

Figure 20:
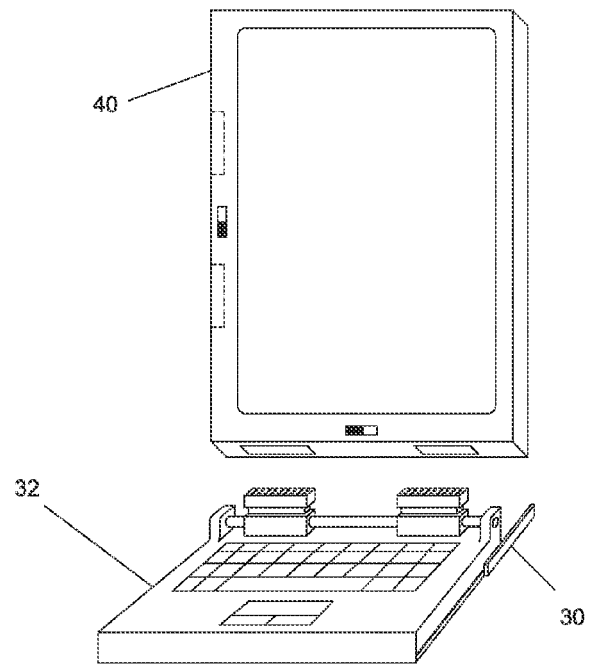
FIG. 20 is a perspective view of a portable computer having an oversized detachable display with deployed support structures.

The use of deployable support beams 30 may be particularly advantageous when using a screen that is relatively large compared to base 32, configured in a portrait orientation, further extending the computer's center of gravity away from the plane of base 32. Such a configuration is illustrated in FIG. 20, when large oversized screen 40 is positioned in portrait orientation relative to base 32. The support beams 30 provide added stability to facilitate use of the computer in this configuration.

Figure 21:
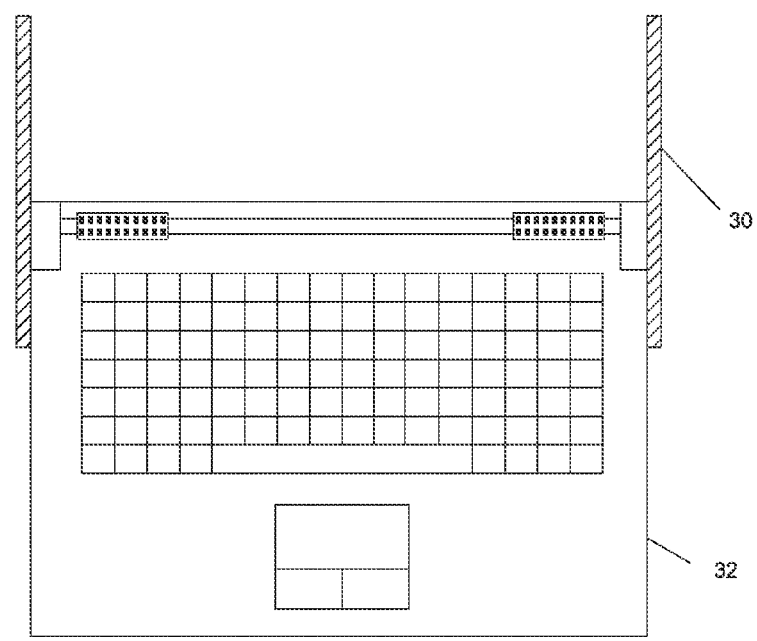
FIG. 21 is a top plan view of a portable computer base unit having a deployed tray support structure.

FIG. 21 is a partial top plan view of the portable computer of FIG. 20 (with the screen unit removed for clarity) which shows deployed support beams 30 at each side of the base unit.

Figure 22:
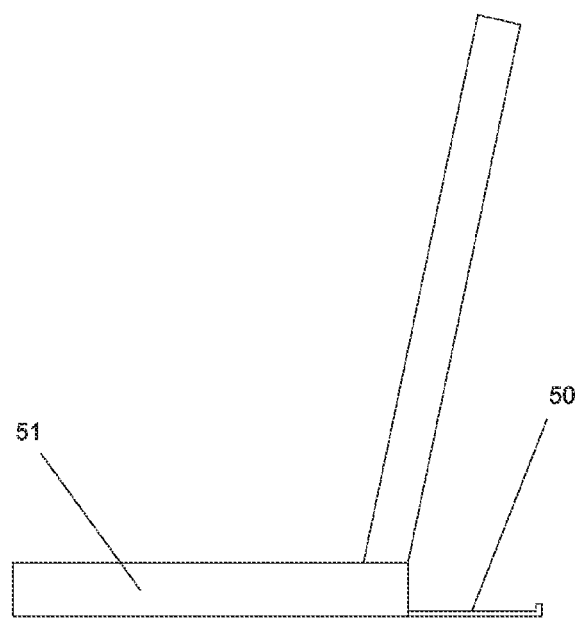
FIG. 22 is a side view of a portable computer having a deployed tray support structure, in accordance with another embodiment of the invention.
Figure 23:
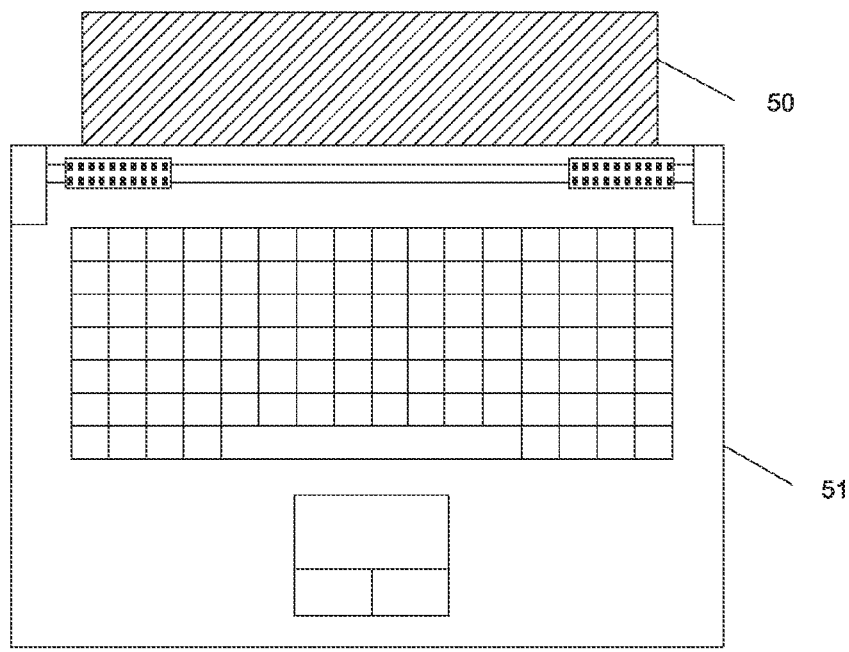
FIG. 23 is a top plan view of a portable computer base unit having a deployed tray support structure.

While the embodiments of FIGS. 17-21 illustrate support structures that include beam components slidably-engaged with groove structures in a base unit, other support structures and means of moving the support structure relative to a computer base or computer screen can be readily employed in other embodiments of the invention. FIG. 22 illustrates such an alternative support structure. In FIG. 22, base 51 includes a support structure which includes tray 50, which is a flat structure coplanar with base 51, and which can be alternatively extended or retracted from the rear portion of base 51. FIG. 23 shows a top view of the computer base (without screen for clarity) with its tray support structure deployed.

Support structures such as beams 30 and tray 50 can also equipped with a detent mechanism to secure the beam or tray at desired positions relative to base 32 and 51, respectively. In some embodiments of the invention, the detent may consist of a fastener, such as a screw, nut or wingnut, adapted to mechanically secure the support structure in a desired position relative to the base unit.

Figure 24:
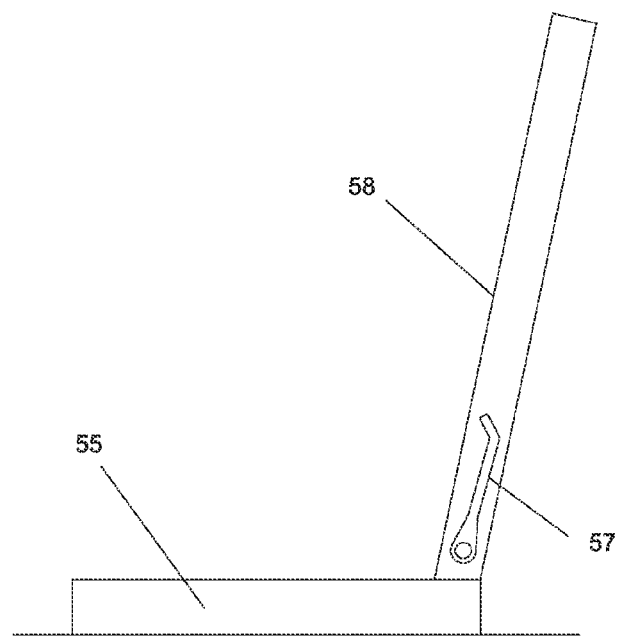
FIG. 24 is a side view of a portable computer having a support structure integrated into the screen unit, shown in a stowed position, in accordance with another embodiment of the invention.
Figure 25:
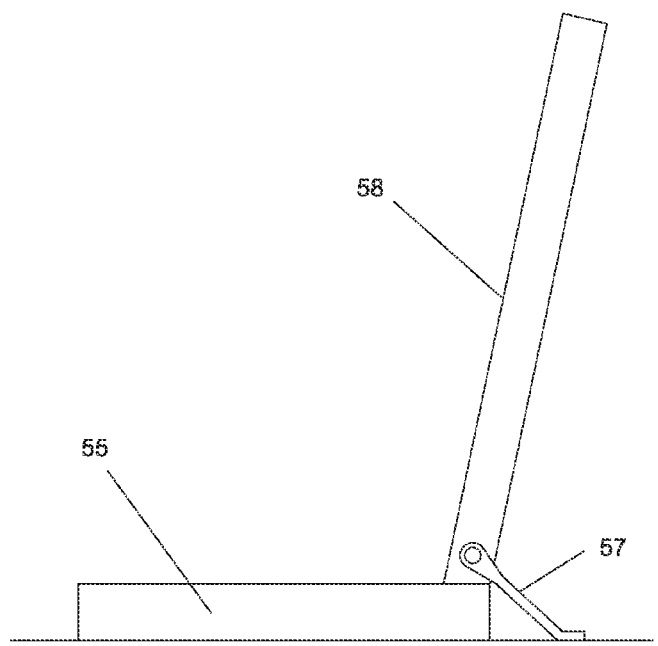
FIG. 25 is a side view of a portable computer having a support structure integrated into the screen unit, shown in deployed position.

In other embodiments, a support mechanism can be movably engaged with the screen as opposed to the base. FIGS. 24 and 25 show one embodiment of such a mechanism. Support arms 57 are rotatably secured to the sides of display 58 via a hinge mechanism near its bottom end. In the stowed position, illustrated in FIG. 24, support arms 57 are aligned adjacent the sides of screen 58. In a deployed position, illustrated in FIG. 25, support arms 57 are rotated downwards, away from screen 58, such that the far end of support arm 57 is approximately coplanar with the bottom of base unit 55, thereby providing added stability and helping prevent the portable computer from tipping backwards.

Figure 26:
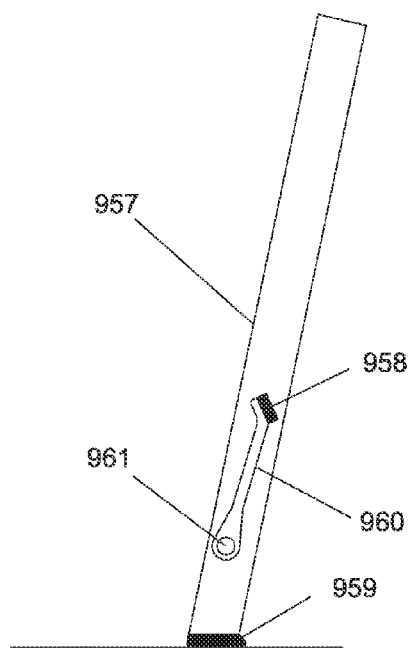
FIG. 26 is a side elevation of a portable computer display unit having an integrated support structure, shown in a stowed position, in accordance with another embodiment of the invention.
Figure 27:
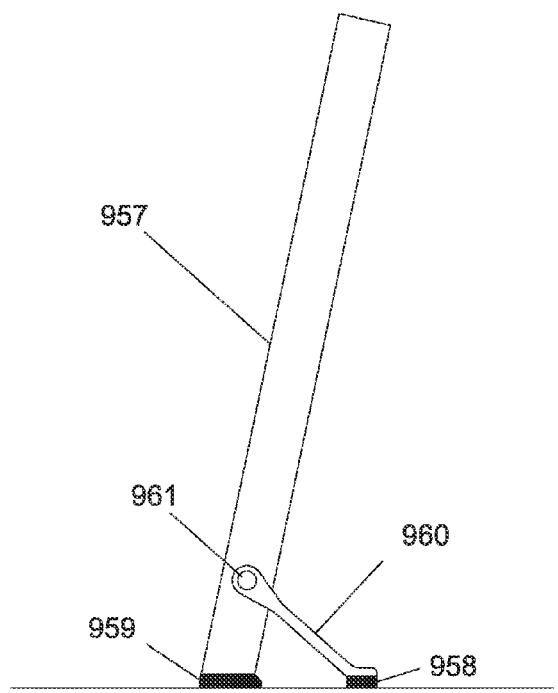
FIG. 27 is a side elevation of a portable computer display unit having an integrated support structure, shown in a deployed position.

For embodiments in which the display unit is capable of standalone operation, a display-attached support mechanism, such as that illustrated in FIGS. 24 and 25, can be further employed to support the display unit in an inclined position when separated from a base unit. FIGS. 26 and 27 illustrate such an embodiment. Support mechanism 960 is attached to display unit 957 via hinge mechanism 961. In FIG. 26, support mechanism 960 is in a retracted position. In FIG. 27, support mechanism 960 is extended into a deployed position, in which it acts to support display unit 957 in an upright position relative to a flat surface, such as a desk or airplane tray. To improve stability, support mechanism 960 includes anti-slip attachment 958 at the end opposite hinge structure 961. Additionally or alternatively, display unit 957 may include anti-slip attachment 959 on an edge surface to further discourage sliding of the display unit when set in an upright position. Anti-slip attachments 958 and 959 may be formed from rubber, or other materials that resist sliding movement compared to the material from which the housing of display unit 957 is formed, or the material from which support mechanism 960 is formed. Support mechanism 960 can be deployed to support display unit 957 in an upright position regardless of whether display unit 957 is used in a standalone configuration, or attached to a base unit.

While support mechanism 960 pivots around a hinge mechanism to extend from a side of display unit 957, it is contemplated that alternative support structures could be employed, particularly to the extent support structures can be alternatively deployed and retracted based on, e.g., the form factor with which the display unit is being used. Other examples include slidable support structures and retractable support structures. In some embodiments, support structures can be provided for both landscape and portrait orientations.

I claim:

1. A portable computer system comprising:
    a first unit comprising a touch-sensitive LCD display screen, a microprocessor, digital memory and a battery;
    a support structure, the support structure having a first portion movably attached to the first unit to alternatively move between a stowed position and a deployed position; the support structure further having a second portion which extends away from the first unit when the support structure is in the deployed position, and rests proximate the first unit when the support structure is in the stowed position; and
    a second unit comprising a keyboard, the second unit capable of being alternatively attached to and detached from said first unit;
    wherein said support structure can support said first unit on a planar surface in an inclined position relative to said surface when the support structure is in the deployed position, both when said second unit is attached to said first unit and when said second unit is detached from said first unit.

2. The portable computer system of claim 1, in which:
    the first unit is formed generally in the shape of a cuboid having a flat top surface proximate said display screen, a bottom surface, and four sides;
    the first unit further comprises a receptacle positioned within one of said first unit sides; and
    the second unit further comprises a connector adapted for removable insertion into said first unit receptacle, via which electrical signals can be conveyed between the first unit and second unit.

3. The portable computer system of claim 2, in which:
    a first and second of said four first unit sides are long sides;
    a third and fourth of said four first unit sides are short sides;
    wherein said receptacle is located within the first of said four first unit sides.

4. The portable computer system of claim 3, in which the first of said four first unit sides and the first unit top surface meet to form an acute interior angle, such that the first unit can be rested on a planar surface in an inclined position with the support structure deployed, with the first side of said first unit oriented parallel with said planar surface and the second portion of the support structure contacting the planar surface.

5. The portable computer system of claim 2, wherein the second unit connector is movably attached to said second unit such that the second unit connector can be tilted relative to said second unit keyboard.

6. The portable computer system of claim 1, further comprising a hinge mechanism attaching the support structure to the first unit.

7. The portable computer system of claim 1, in which the support structure is generally coplanar with the first unit when in the stowed position.

8. The portable computer system of claim 1, in which said support structure comprises an elongated member.

9. A portable computer comprising:
    a front surface;
    a touch sensitive display panel visible through said front surface;
    a housing comprised of a back surface, at least a portion of which is substantially parallel with said front surface;
    said housing further comprising a top surface, a bottom surface and two side surfaces;
    said top, bottom and side surfaces extending between said front surface and said back surface;
    an integrated support, said support being movable between a stowed position and a deployed position;
    a connector located within said bottom surface, said connector adapted for removable connection with a keyboard base unit.

10. The portable computer of claim 9, in which said integrated support is attached to said computer to permit hinged motion relative to said housing.

11. The portable computer of claim 9, in which
    when in the stowed position, said support lies between planes formed by said front surface and a rearmost portion of said back surface; and
    when in the deployed position, said support extends beyond said plane formed by said rearmost portion of said computer back surface.

12. The portable computer of claim 10, in which
    said integrated support is attached in a location partway between said housing top surface and said housing bottom surface; and
    when in the deployed position, an acute angle is formed between said support and a portion of said back surface extending between said housing bottom surface and said integrated support attachment location.

13. The portable computer of claim 9, in which said support is attached to said portable computer body via one or more hinges.

14. The portable computer of claim 9, in which said support further comprises an anti-slip structure formed on a distal end of said support.

15. The portable computer of claim 14, in which said anti-slip structure and said support are comprised of the same material.

16. The portable computer of claim 9, in which said computer further comprises a motherboard, a battery and a solid state data storage device.

* * * * *